(12) United States Patent
Kamler

(10) Patent No.: US 12,527,458 B2
(45) Date of Patent: Jan. 20, 2026

(54) TELESCOPIC ATTACHMENT FOR ENDOSCOPE

(71) Applicant: ALPINE MEDICAL DEVICES, LLC, Carmel, CA (US)

(72) Inventor: Jan P. Kamler, Carmel, CA (US)

(73) Assignee: Alpine Medical Devices, LLC, Carmel (CA)

( * ) Notice: Subject to any disclaimer, the term of this patent is extended or adjusted under 35 U.S.C. 154(b) by 518 days.

(21) Appl. No.: 17/636,574

(22) PCT Filed: Aug. 27, 2020

(86) PCT No.: PCT/US2020/048173
§ 371 (c)(1),
(2) Date: Feb. 18, 2022

(87) PCT Pub. No.: WO2021/041655
PCT Pub. Date: Mar. 4, 2021

(65) Prior Publication Data
US 2022/0273163 A1    Sep. 1, 2022

Related U.S. Application Data

(60) Provisional application No. 62/892,454, filed on Aug. 27, 2019.

(51) Int. Cl.
*A61B 1/00* (2006.01)
*A61B 17/00* (2006.01)
*A61B 17/12* (2006.01)

(52) U.S. Cl.
CPC .... *A61B 1/00089* (2013.01); *A61B 17/12013* (2013.01); *A61B 2017/00296* (2013.01);
(Continued)

(58) Field of Classification Search
CPC .......... A61B 1/00089; A61B 17/12013; A61B 2017/00296; A61B 2017/00818;
(Continued)

(56) References Cited

U.S. PATENT DOCUMENTS 3,760,810 A    9/1973    Van Hoorn
3,967,625 A    7/1976    Yoon
(Continued)

FOREIGN PATENT DOCUMENTS

CN    86203090 U    4/1987
CN    2036031 U     4/1989
(Continued)

OTHER PUBLICATIONS

Kamler; U.S. Appl. No. 17/792,433 entitled "Endoscope-attached percutaneous gastrostomy tube," filed Jul. 13, 2022.
(Continued)

*Primary Examiner* — Shaun L David
*Assistant Examiner* — Rachael L Geiger
(74) *Attorney, Agent, or Firm* — Shay Glenn LLP

(57) ABSTRACT

A telescopic attachment mechanism includes an inner cylinder configured to attach around a distal end of a scope and an outer cylinder slidingly attached around the inner cylinder. The outer cylinder is configured to move from a proximal retracted position to a distal extended position. The outer cylinder in the distal extended position is configured to extend distally beyond the distal end of the scope.

16 Claims, 13 Drawing Sheets

(52) U.S. Cl.
CPC .............. *A61B 2017/00818* (2013.01); *A61B 2017/00991* (2013.01); *A61B 2017/12018* (2013.01)

(58) Field of Classification Search
CPC A61B 2017/00991; A61B 2017/12018; A61B 1/00101; A61B 1/00135; A61B 1/00137; A61B 1/0014
See application file for complete search history.

(56) References Cited

U.S. PATENT DOCUMENTS

| | | | |
|---|---|---|---|
| 4,226,239 A | 10/1980 | Polk et al. | |
| 4,735,194 A | 4/1988 | Stiegmann | |
| 4,798,592 A | 1/1989 | Parks | |
| 5,083,549 A | 1/1992 | Cho et al. | |
| 5,203,863 A | 4/1993 | Bidoia | |
| 5,320,630 A | 6/1994 | Ahmed | |
| 5,356,416 A | 10/1994 | Chu et al. | |
| 5,462,559 A | 10/1995 | Ahmed | |
| 5,507,797 A | 4/1996 | Suzuki et al. | |
| 5,569,268 A | 10/1996 | Hosoda | |
| 5,624,453 A | 4/1997 | Ahmed | |
| 5,643,293 A | 7/1997 | Kogasaka et al. | |
| 5,735,861 A | 4/1998 | Peifer et al. | |
| 5,741,273 A | 4/1998 | O'Regan | |
| 5,788,715 A * | 8/1998 | Watson, Jr. | A61B 17/12013 606/140 |
| 6,007,551 A | 12/1999 | Peifer et al. | |
| 6,059,719 A | 5/2000 | Yamamoto et al. | |
| 6,136,009 A | 10/2000 | Mears | |
| 6,235,040 B1 | 5/2001 | Chu et al. | |
| 6,547,798 B1 | 4/2003 | Yoon et al. | |
| 6,610,072 B1 | 8/2003 | Christy et al. | |
| 6,685,713 B1 | 2/2004 | Ahmed | |
| 6,706,052 B1 | 3/2004 | Chin | |
| 6,923,756 B2 | 8/2005 | Sudakov et al. | |
| 7,037,314 B2 | 5/2006 | Armstrong | |
| 7,189,247 B1 | 3/2007 | Zirps et al. | |
| 7,278,972 B2 | 10/2007 | Lamoureux et al. | |
| 8,062,308 B2 | 11/2011 | Noda et al. | |
| 8,177,742 B1 | 5/2012 | Bagwell et al. | |
| 8,337,394 B2 | 12/2012 | Vakharia | |
| 8,974,474 B2 | 3/2015 | Kamler | |
| 9,138,227 B2 | 9/2015 | Schostek et al. | |
| 9,504,472 B2 | 11/2016 | Kamler | |
| 9,603,614 B2 | 3/2017 | Schurr | |
| 9,693,778 B2 | 7/2017 | Kamler | |
| 10,702,273 B2 | 7/2020 | Kamler | |
| 2002/0002361 A1 | 1/2002 | Fanelli et al. | |
| 2002/0026199 A1 | 2/2002 | Fortier et al. | |
| 2002/0072757 A1 | 6/2002 | Ahmed et al. | |
| 2003/0009086 A1 | 1/2003 | Black et al. | |
| 2003/0100909 A1 | 5/2003 | Suzuki | |
| 2003/0229334 A1 | 12/2003 | Suzuki et al. | |
| 2004/0006256 A1 | 1/2004 | Suzuki et al. | |
| 2004/0220449 A1 * | 11/2004 | Zirps | A61B 1/0014 600/131 |
| 2005/0277955 A1 | 12/2005 | Palmer et al. | |
| 2006/0058816 A1 | 3/2006 | Hassanien | |
| 2006/0089660 A1 | 4/2006 | Saeed et al. | |
| 2006/0122632 A1 | 6/2006 | Hassanien et al. | |
| 2006/0161170 A1 | 7/2006 | DeLuca et al. | |
| 2006/0229566 A1 | 10/2006 | Hanagasaki | |
| 2006/0258904 A1 | 11/2006 | Stefanchik et al. | |
| 2006/0259041 A1 | 11/2006 | Hoffman et al. | |
| 2007/0078430 A1 | 4/2007 | Adams | |
| 2007/0093855 A1 | 4/2007 | Zhang | |
| 2007/0118162 A1 | 5/2007 | Abi Kheirs | |
| 2007/0233221 A1 | 10/2007 | Raju | |
| 2008/0004622 A1 | 1/2008 | Coe et al. | |
| 2008/0009668 A1 | 1/2008 | Cohn | |
| 2008/0255412 A1 | 10/2008 | Surti | |
| 2008/0287965 A1 | 11/2008 | Ducharme | |
| 2009/0131748 A1 | 5/2009 | Chami | |
| 2009/0198255 A1 | 8/2009 | Ikeda | |
| 2009/0306472 A1 | 12/2009 | Filipi et al. | |
| 2010/0010303 A1 | 1/2010 | Bakos | |
| 2010/0063517 A1 | 3/2010 | Cleator | |
| 2011/0077666 A1 * | 3/2011 | McCahon | A61B 17/12013 606/139 |
| 2012/0078272 A1 | 3/2012 | Smith | |
| 2013/0090527 A1 | 4/2013 | Axon | |
| 2014/0114341 A1 | 4/2014 | Wolff et al. | |
| 2014/0142596 A1 * | 5/2014 | Knotts | A61B 17/00234 606/140 |
| 2015/0250992 A1 | 9/2015 | Morriss et al. | |
| 2016/0206347 A1 | 7/2016 | Bar et al. | |
| 2019/0021762 A1 | 1/2019 | Mills et al. | |
| 2019/0183328 A1 | 6/2019 | Axon | |

FOREIGN PATENT DOCUMENTS

| | | |
|---|---|---|
| CN | 2332365 Y | 8/1999 |
| CN | 2596947 Y | 1/2004 |
| CN | 201067419 Y | 6/2008 |
| CN | 201067420 Y | 6/2008 |
| EP | 1147744 A2 | 10/2001 |
| GB | 1334560 A | 10/1973 |
| GB | 2426459 A | 11/2006 |
| JP | 10501165 A | 2/1998 |
| JP | 200217665 A | 1/2002 |
| JP | 04312745 B2 | 8/2009 |
| WO | WO96/24292 A1 | 8/1996 |
| WO | WO99/65400 A1 | 12/1999 |
| WO | WO2004/021865 A2 | 3/2004 |
| WO | WO2007/079674 A1 | 7/2007 |
| WO | WO2009/144694 A1 | 12/2009 |
| WO | WO2021/146637 A1 | 7/2021 |

OTHER PUBLICATIONS

Wikipedia; Endoscopy; 7 pgs.; retrieved from the internet Sep. 28, 2012 (http://en.wikipedia.org/wiki/Endoscopy).

* cited by examiner

SECTION A-A

TELESCOPIC ATTACHMENT FOR ENDOSCOPE

CROSS REFERENCE TO RELATED APPLICATIONS

This application claims priority to U.S. Patent Provisional Application No. 62/892,454, filed on Aug. 27, 2019, and titled "TELESCOPIC ATTACHMENT FOR ENDOSCOPE," the entirety of which is incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Endoscopes are used in daily gastrointestinal medical practices to diagnose and treat a variety of gastrointestinal conditions. Multiple endoscopic devices have been designed that are attached to the tip of an endoscope, such as ligators for ligation of esophageal varices or hemorrhoids, transparent caps for tissue removal, Ovesco clips for bleeding or closure of perforated viscus, and Ovesco dilating caps for dilation of gastrointestinal strictures. Often, the devices are attached to the tip of the endoscope in such a way that at least a portion of the device extends over the tip of the scope, resulting in impaired visualization during endoscopic procedures. Such impaired vision can be especially dangerous or problematic during emergency medical procedures with active bleeding.

SUMMARY OF THE DISCLOSURE

In general, in one embodiment, a telescopic attachment mechanism includes an inner cylinder configured to attach around a distal end of a scope and an outer cylinder slidingly attached around the inner cylinder. The outer cylinder is configured to move from a proximal retracted position to a distal extended position. The outer cylinder in the distal extended position is configured to extend distally beyond the distal end of the scope.

This and other embodiments can include one or more of the following features. The inner cylinder can be configured to attach around the distal end of the scope such that a distal tip of the inner cylinder and a distal tip of the scope are substantially flush. A distal end of the outer cylinder in the proximal retracted position can be substantially aligned with a distal end of the inner cylinder. The distal end of the outer cylinder in the proximal retracted position can be 5 mm or less from the distal end of the inner cylinder. The outer cylinder in the distal extended position can be configured to extend up to 30 mm beyond the distal end of the scope. An outer surface of the inner cylinder can include a first anti-rotational element, and an inner surface of the outer cylinder can include a second anti-rotational element. The first and second anti-rotational elements can be configured to engage with one another to maintain rotational alignment of the inner cylinder with the outer cylinder. The telescopic attachment mechanism can further include an attachment ring configured to fit around the inner cylinder and the distal end of the scope to attach the inner cylinder to the distal end of the scope. The telescopic attachment mechanism can further include an advancement string attached to a proximal end of the outer cylinder. The advancement string can be configured to loop over a distal end of the inner cylinder and the scope and to extend proximally through a working channel of the scope. The advancement string can be configured such that pulling proximally on the advancement string moves the outer cylinder distally. The outer cylinder can include one or more grooves on an inner surface thereof configured to house the advancement string. The telescopic attachment mechanism can further include a retraction string attached to a distal end of the outer cylinder. The retraction string can be configured to loop over a distal end of the inner cylinder and the scope and to extend proximally through a working channel of the scope. The retraction string can be configured such that pulling proximally on the retraction string moves the outer cylinder proximally. The outer cylinder can include one or more grooves on an inner surface thereof configured to house the retraction string. The inner cylinder can include a plurality of extendable projecting elements. The extendable projecting elements can be configured to collapse when the outer cylinder is in the proximal retracted position and to expand radially when the outer cylinder is in the distal extended position. The outer cylinder can include a plurality of ligating bands therearound. The telescopic attachment mechanism can further include a banding string having beads thereon. The beads can be configured to be positioned between each ligating band. The banding string can be configured to loop over a distal end of the inner cylinder and the scope and to extend proximally through a working channel of the scope. The banding string can be configured such that pulling the banding string proximally causes the ligating bands to be moved distally off of the outer cylinder. The outer cylinder can be further configured to rotate relative to the inner cylinder. The inner cylinder can include a cylindrical drive lug thereon and the outer cylinder can include an angled drive slot configured to allow the cylindrical drive lug to move therein. The telescopic attachment mechanism can further include an advancement string wrapped around the inner cylinder and attached to a proximal end of the inner cylinder. The advancement string can be configured such that pulling proximally on the advancement string rotates the outer cylinder relative to the inner cylinder and moves the outer cylinder distally.

In general, in one embodiment, a method of performing a medical procedure includes: (1) inserting a scope into the body lumen, where the scope includes a telescoping attachment mechanism attached thereto, and where an outer cylinder of the telescoping attachment mechanism is in a proximal retracted position as the scope is inserted into the body lumen; (2) moving the outer cylinder to a distal extended position; and (3) performing a procedure in the body lumen with a working element on the telescoping attachment mechanism while the outer cylinder is in the distal extended position.

This and other embodiments can include one or more of the following features. The working element can be a ligator. Performing a procedure in the body lumen can include performing variceal or hemorrhoidal banding. The working element can include a plurality of projecting elements. The projecting elements can be retracted when the outer cylinder is in the proximal retracted position and extended radially outwards when the outer cylinder is in the distal extended position. The projecting elements can be retracted between the outer cylinder and an inner cylinder of the telescoping attachment mechanism when the outer cylinder is in the proximal retracted position. Performing a procedure in the body lumen can include examining for polyps. The outer cylinder can be positioned outside of an angle of view of the scope when the outer cylinder is in the proximal retracted position.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
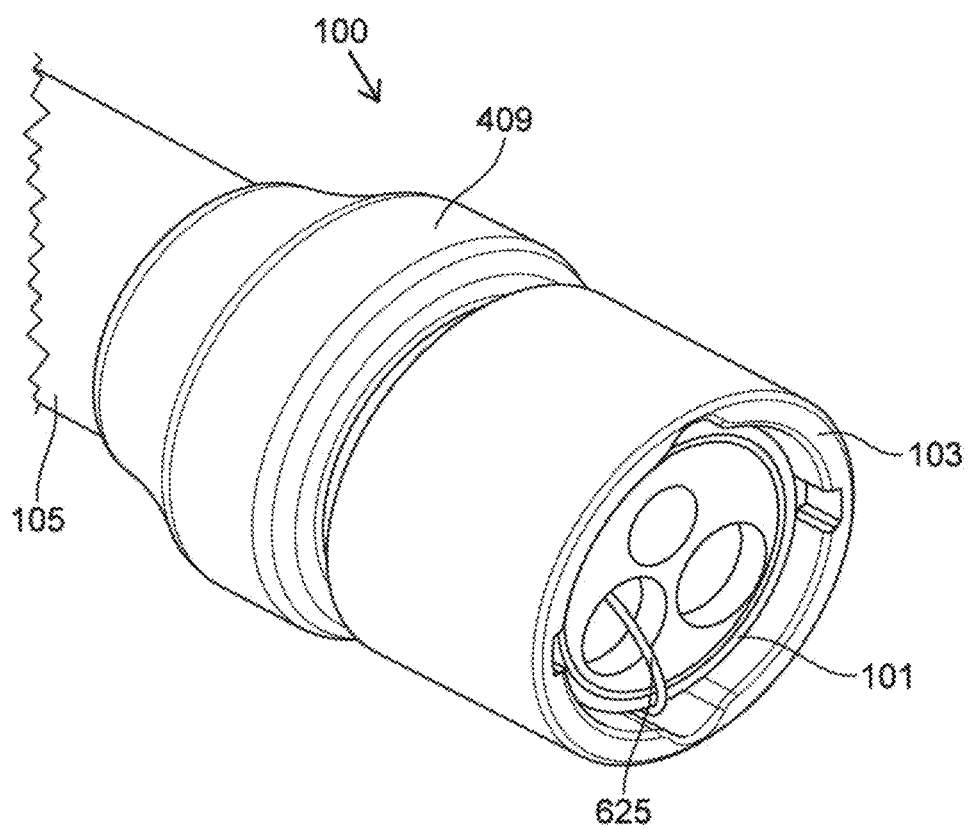
FIGS. 1A-1B show a telescopic attachment mechanism for a scope in a retracted position.

Described herein is a telescopic attachment mechanism (e.g., for an endoscopic tip device such as a ligator, clip, or cap) that can both eliminate impaired visualization during endoscopic procedures and allow for variations in length of the attached devices. In general, the telescopic attachment mechanism can include two cylinders. The inner (smaller diameter) cylinder can attach to the tip of an endoscope, and the outer (larger diameter) cylinder can slide proximally and distally over and relative to the inner cylinder.

An exemplary telescopic attachment mechanism 100 is shown in FIGS. 1A-2B. The attachment mechanism 100 includes an inner cylinder 101 positioned radially within an outer cylinder 103. The inner cylinder 101 is attached around and to the distal end of an endoscope 105, and the outer cylinder 103 can slide relative to the inner cylinder 101 from a retracted position (shown in FIGS. 1A-1B) in which the outer cylinder 103 substantially aligns with the distal end of the scope 105 of the distal end of the inner cylinder 101 (e.g., is 5 mm or less, such as 2 mm or less from the distal end of the scope 105 or the inner cylinder 101) to an extended position (shown in FIGS. 2A-2B) in which the outer cylinder 103 extends distally beyond the distal end of the scope 105 or the inner cylinder 101 (e.g., extends up to 30 mm forward, such as up to 20 mm forward, such as up to 15 mm forward from the distal end of the scope 105 or the distal end of the inner cylinder 101).

Figure 3A:
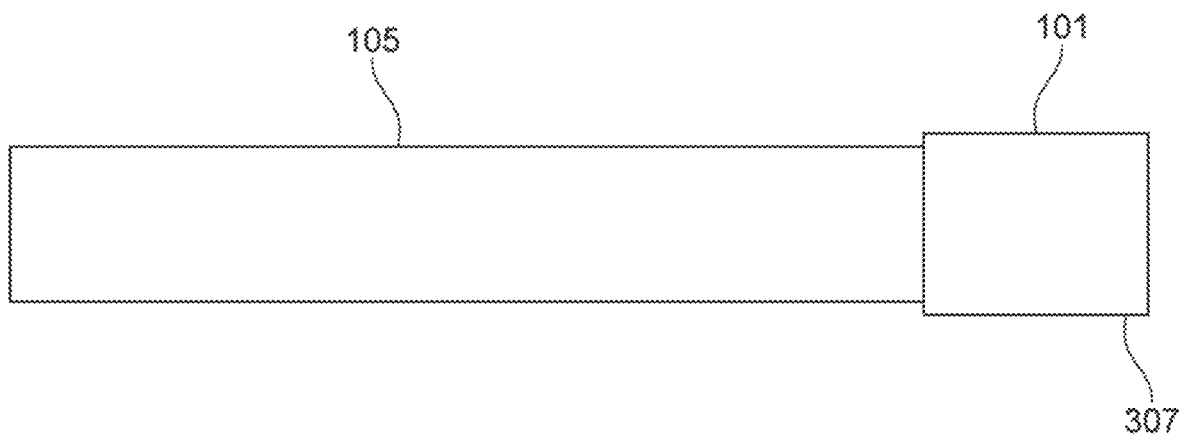
FIGS. 3A-3B show the inner cylinder of the mechanism of FIGS. 1A-1B.
Figure 3B:
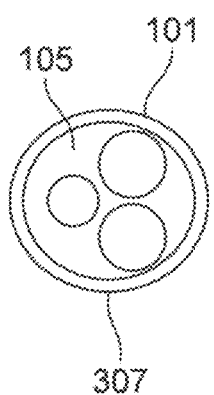
Figure 4:
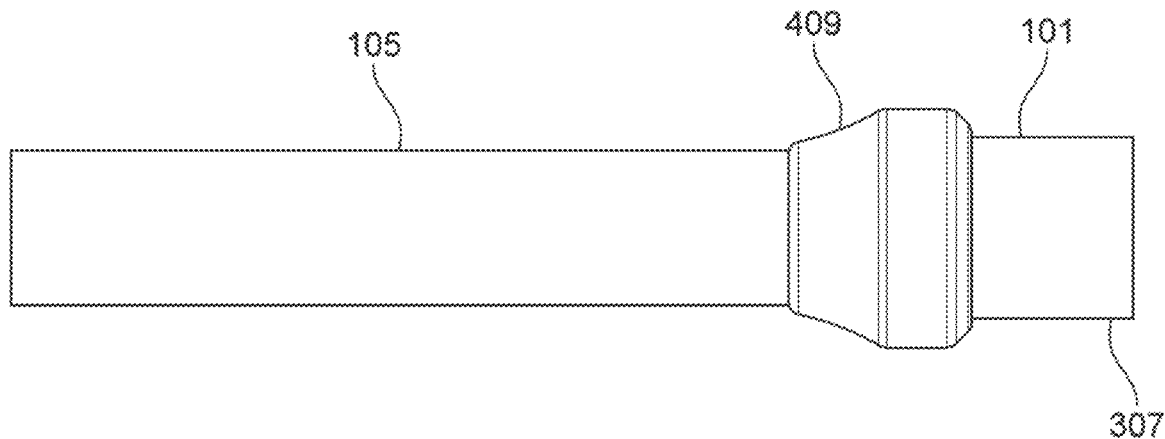
FIG. 4 shows the inner cylinder of the mechanism of FIGS. 1A-1B with an attachment ring therearound.
Figure 5A:
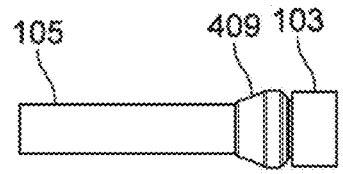
FIGS. 5A-5D show the outer cylinder of the mechanism of FIGS. 1A-1B.
Figure 5B:
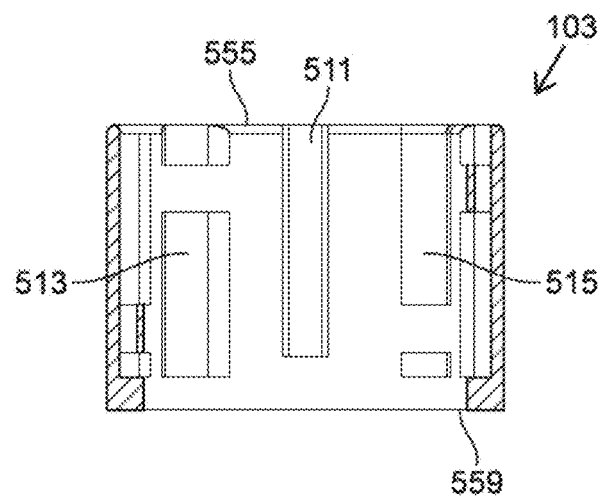
Figure 5C:
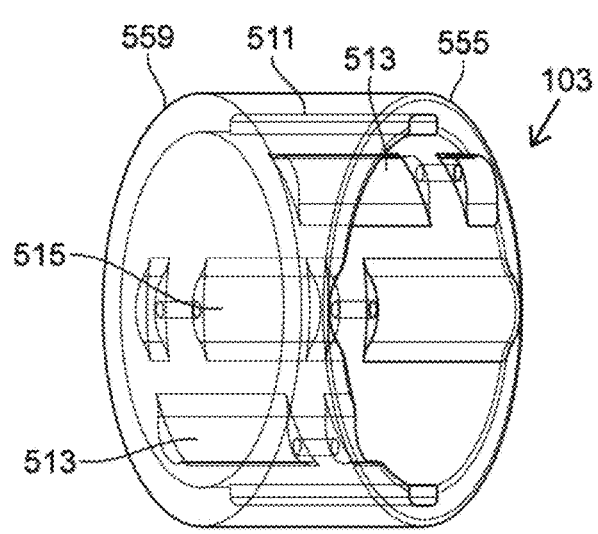
Figure 5D:
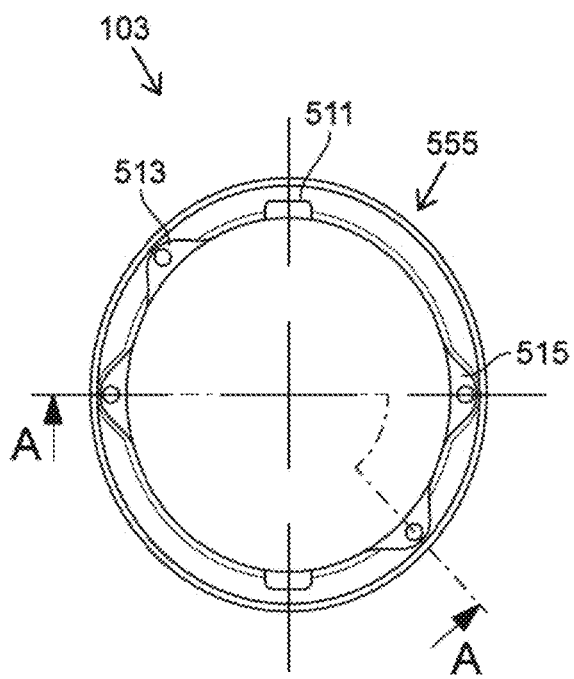

Referring to FIGS. 3A-3B, the inner cylinder 101 can have a smooth inner surface and an outer surface that includes anti-rotational elements (such as the two lugs 307) thereon. The anti-rotational elements can be, for example, positioned at the distal end of the inner cylinder 101 approximately 180 degrees apart from one another. As shown in FIG. 4, the inner cylinder 101 can be releasably attached to (and around) the distal end of the endoscope 105 with an attachment ring 409, such as a rubber ring configured to friction fit to the endoscope 105 and the inner cylinder 101. The inner cylinder 101 can be positioned such that the distal tip thereof is substantially flush with the distal tip of the endoscope 105.

Referring to FIGS. 5A-5D, the outer cylinder 103 can have a smooth outer surface. The inner surface of the outer cylinder 103 can have a pair of anti-rotational elements, such as channels 511 (e.g., positioned 180 degrees apart from one another). The anti-rotational channels 511 can extend substantially axially from the distal end 555 of the outer cylinder 103 towards (but not all the way to) the proximal end 559 of the outer cylinder 103. The shape of the anti-rotational channels 511 can correspond to the shape of the anti-rotational lugs 307 of the inner cylinder 101 so as to fit the lugs 307 therein. The movement of lugs 307 within the anti-rotational channels 511 ensures axial movement of the outer cylinder 103 over the inner cylinder 101.

Referring still to FIG. 5A-5D, the inner surface of the outer cylinder 103 can further include advancement string clearance grooves 515 (e.g., a pair of semicircular grooves 515 positioned 180 degrees apart from one another). The grooves 515 can extend from the distal end 555 of the outer cylinder (but not all the way) to the proximal end 559 of the outer cylinder 103.

Figure 6A:
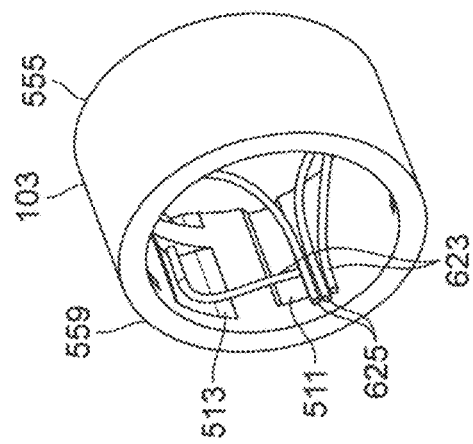
FIGS. 6A-6H show the outer cylinder and advancement/retraction strings of the mechanism of FIGS. 1A-1B.
Figure 6B:
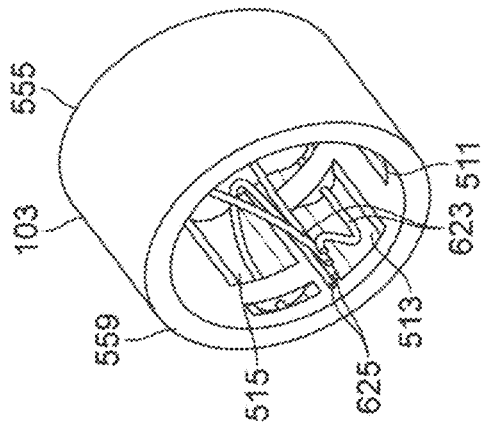
Figure 6C:
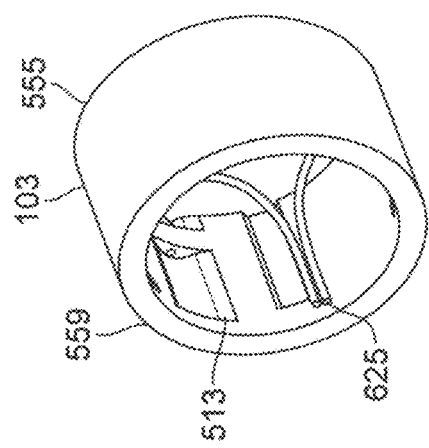
Figure 6D:
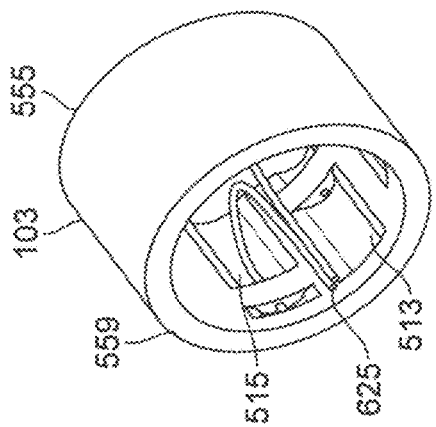
Figure 6E:
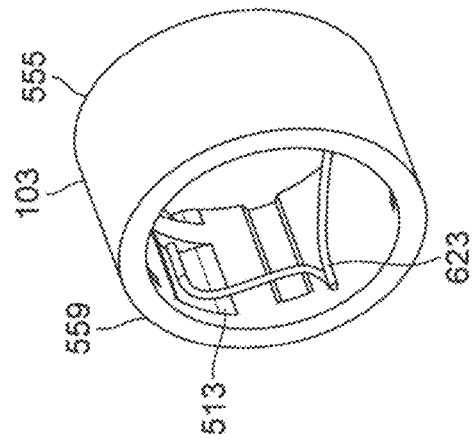
Figure 6F:
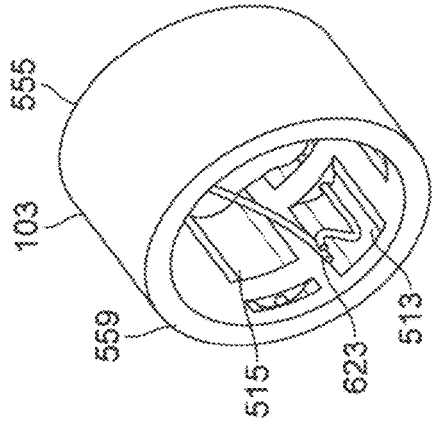
Figure 6G:
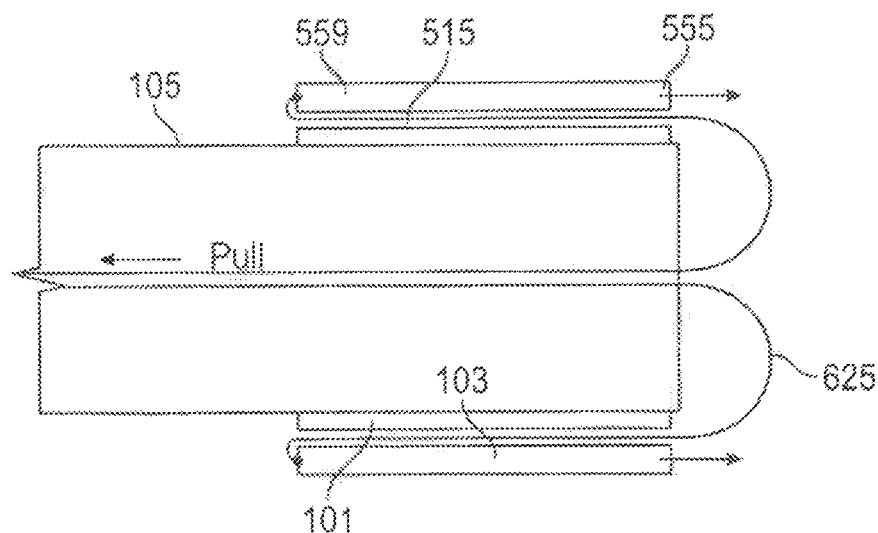
Figure 6H:
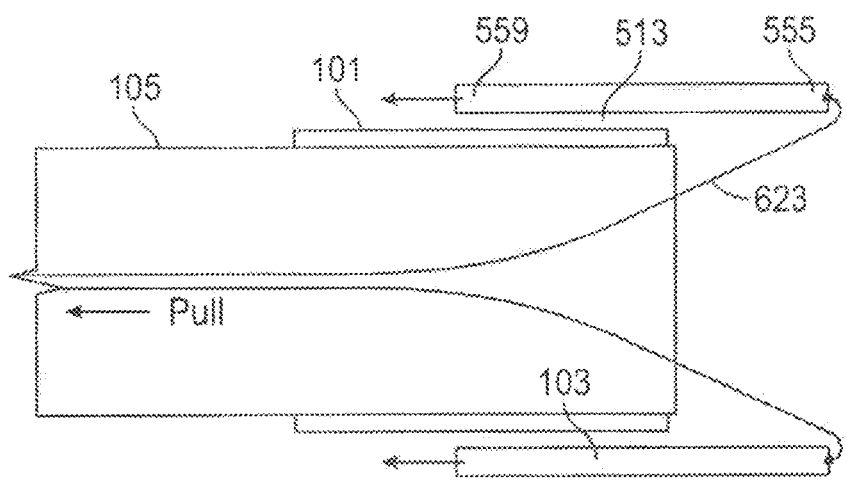
Figure 7A:
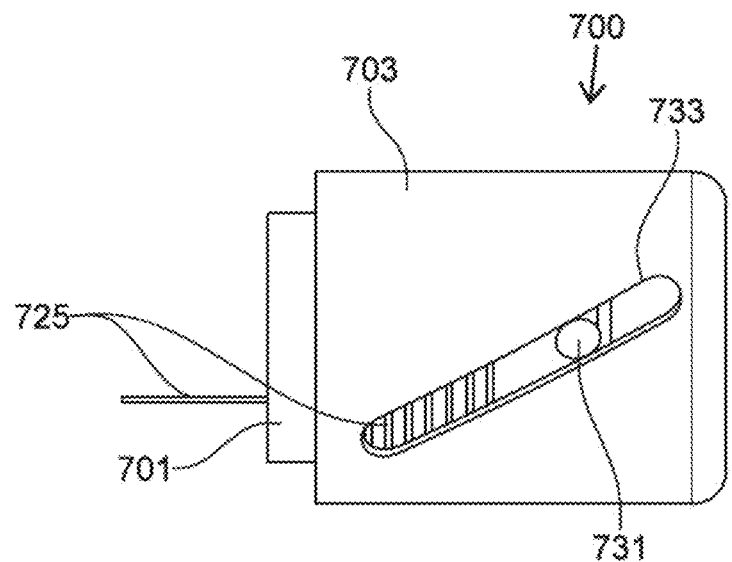
FIGS. 7A-7F show another exemplary telescopic attachment mechanism.
Figure 7B:
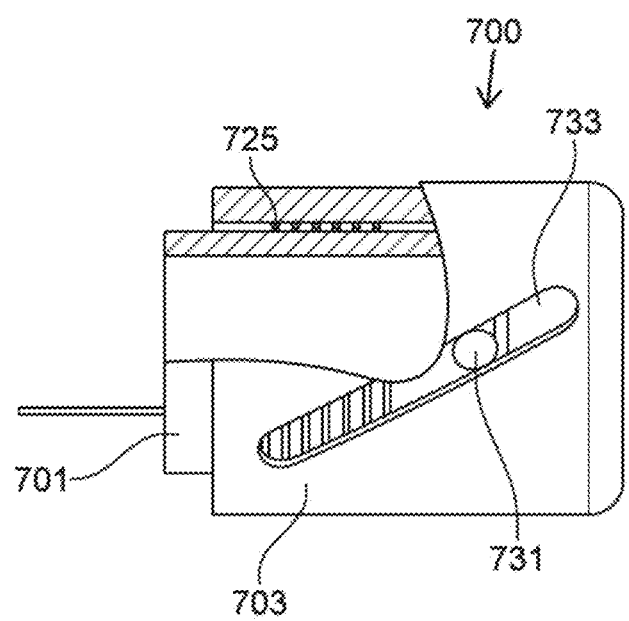
Figure 7C:
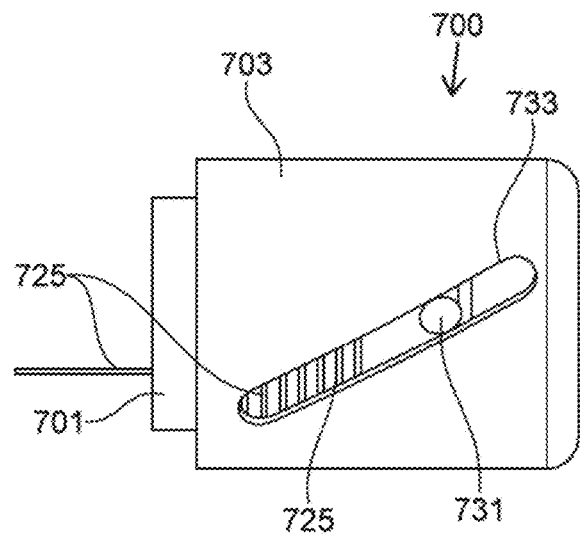
Figure 7D:
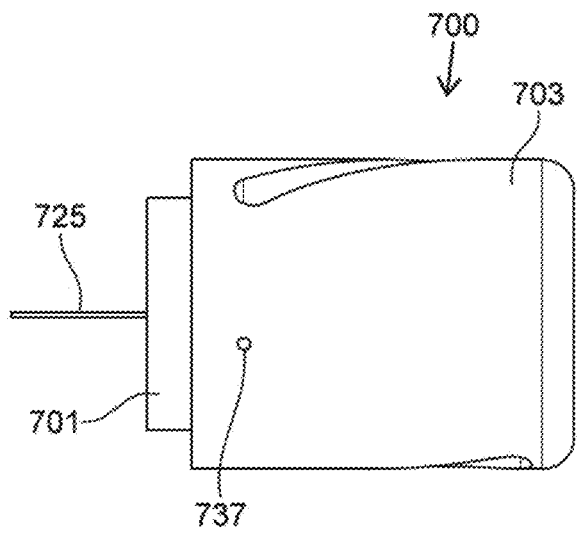
Figure 7E:
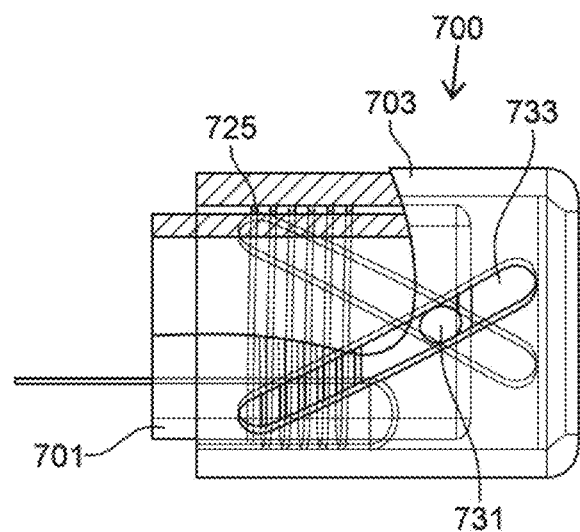
Figure 7F:
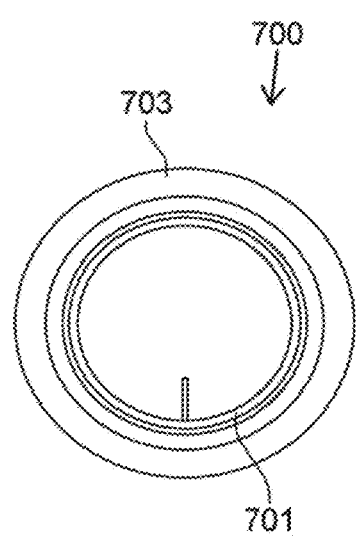

Further, as shown in FIGS. 6A-6D, an advancement string 625 can extend through each of the grooves 515 with the distal end of the advancement string 625 attached at the proximal end 559 of the outer cylinder 103. Each string 625 can be extended through the central working channel of the scope 105, over the distal tip of the scope 105 and the inner cylinder 101, and back down through a groove 515 (i.e., between the inner cylinder 101 and the outer cylinder 103). As shown in FIGS. 6G-6H, because the distal end of the string 625 is attached to the proximal end 559 of the outer cylinder 103, the outer cylinder 103 will move distally when proximal force is placed on the advancement string 625. As a result, the cylinder 103 will telescope forwards relative to the inner cylinder 101 and the scope 105.

Referring back to FIGS. 5A-5D, the inner surface of the outer cylinder 103 can further include a retraction string groove 513 therein. Referring to FIG. 6A-6B and 6E-6F, a retraction string 623 can extend through each of the grooves 513 with the distal end of the retraction string 623 attached at the distal end 555 of the outer cylinder 103. Each string 623 can be extended through the working channel of the scope 105, over the distal tip of the scope 105 and the inner cylinder 101, and into a groove 513 for attachment thereto. As shown in FIGS. 6G-6H, because the distal end of the string 623 is attached to the distal end 555 of the outer cylinder 103, the outer cylinder 103 will move proximally when proximal force is placed on the retraction string 623. As a result, the cylinder 103 will retract backwards relative to the inner cylinder 101 and the scope 105.

Figure 1B:
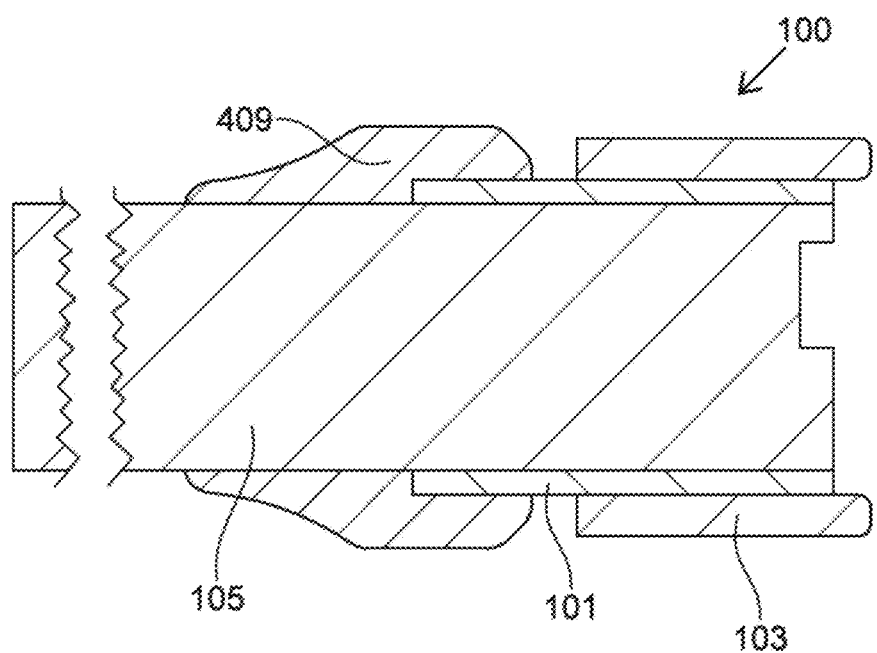
Figure 2A:
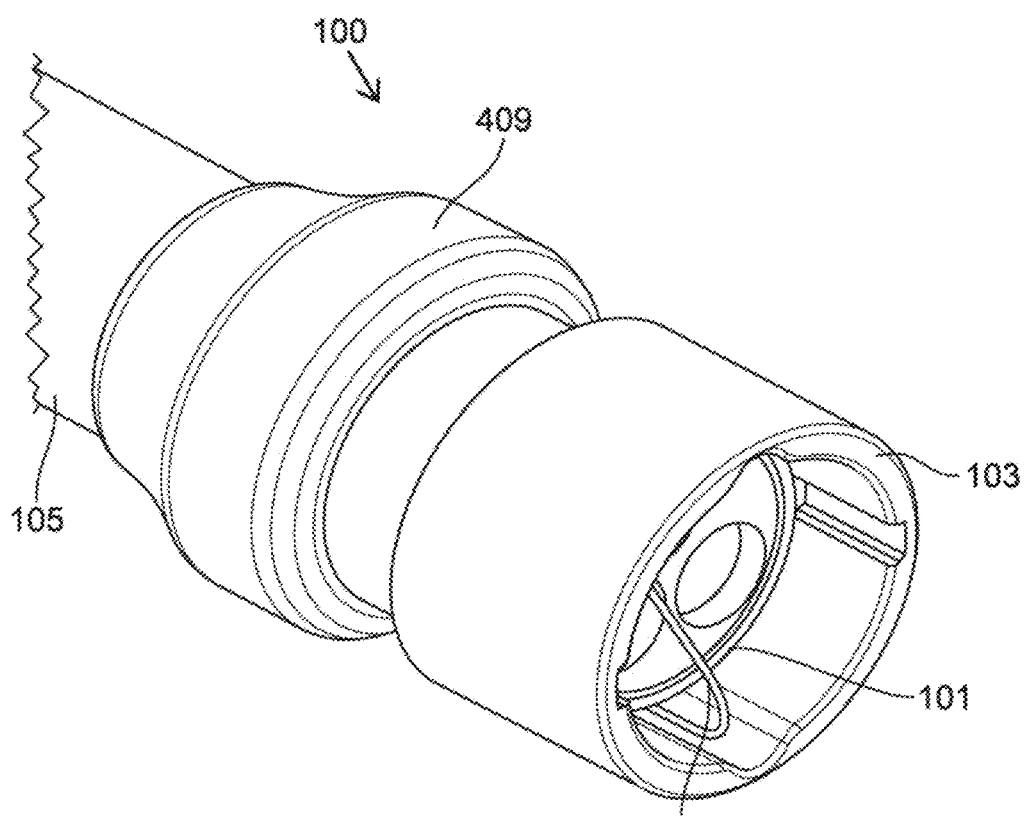
FIGS. 2A-2B show the telescopic attachment mechanism of FIGS. 1A-1B in an extended configuration.
Figure 2B:
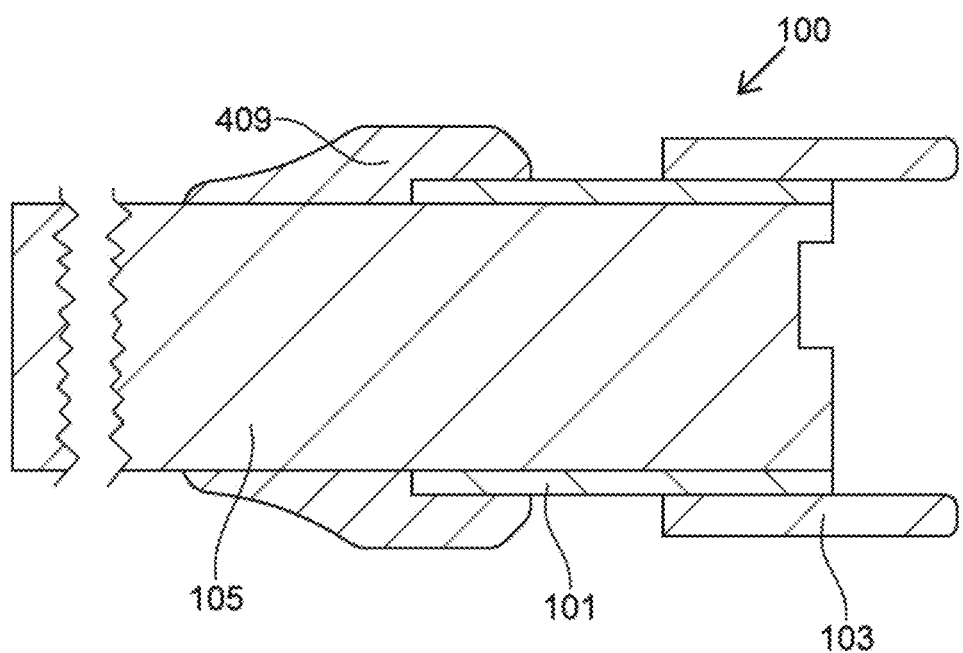

In use, the device 100 can be secured to the tip of the scope 105 with the attachment ring 409. As shown in FIGS. 1A-1B, the distal rims of both the inner cylinder 101 and outer cylinder 103 can be approximately flush (e.g., within 5 mm or less, such as 2 mm or less) with one another and with the scope 105. The advancement string 625 (attached at its distal end to the proximal end 559 of the outer cylinder 103) can be routed over the distal end of the inner cylinder 101 and down through the central channel of the scope 105 (e.g., and attached to a pulling device similar to as described in U.S. Pat. No. 10,702,273, the entirety of which is incorporated by reference herein). Similarly, the retraction string 623 (attached at its distal end to the distal end 555 of the outer cylinder 103) can be routed over the distal end of the inner cylinder 101 and down through the central channel of the scope 105. To advance the outer cylinder 103 distally, the advancement string 625 can be pulled proximally (e.g., to the position shown in FIGS. 2A-2B). To retract the outer cylinder 103 proximally, the retraction string 623 can be pulled proximally.

In some embodiments, the outer cylinder 103 can additionally or alternately be retracted by pushing on the distal end of the cylinder 103 (e.g., by pushing the cylinder 103 against tissue).

Another exemplary telescoping attachment mechanism 700 is shown in FIGS. 7A-7F. The mechanism 700 is similar to mechanism 100 except that the outer cylinder 703 rotates relative to the inner cylinder 701 as it moves distally or proximally. As shown in FIGS. 7A-7F, the inner cylinder 701 can include a cylindrical drive lug 731 near the distal end thereof, and the outer cylinder 703 can include an angled drive slot 733 extending along a length of the outer cylinder 703 and configured such that the lug 731 can slide therein. When the outer cylinder 703 is moved distally relative to the inner cylinder 701, the outer cylinder 703 can simultaneously rotate as the angled drive slot 733 moves along the lug 731. Similar to device 100, the device 700 can include an advancement string 725 configured to extend through the lumen of the scope and attach to the proximal end of the outer cylinder 703 (e.g., at location 737). The advancement string 725 can be further wrapped around the inner cylinder 701 (e.g., wrapped around ½ of the circumference). As the string 725 is pulled proximally, it will cause the outer cylinder 703 to rotate and advance relative to the inner cylinder 701. In some embodiments, the outer cylinder 703 can be retracted using a retraction string similar to as described above with respect to mechanism 100. In other embodiments, the outer cylinder 703 can be retracted by pushing on the distal end of the cylinder 703 (e.g., by pushing the cylinder 703 against tissue).

The telescoping features of the devices described herein can advantageously be used, for example, with treatment mechanisms such as ligators, tissue removal elements, clips, attachment caps, or natural orifice transluminal endoscopic surgery. By using the telescoping features, the treatment mechanisms can be kept in a retracted position (and thereby be less atraumatic and/or less likely to interfere with visualization) until needed and can then be moved to the extended position when necessary.

Figure 8A:
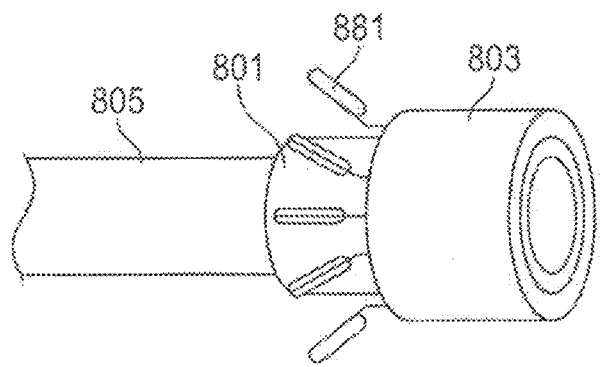
FIGS. 8A-8C show an exemplary telescopic attachment mechanism with projecting elements for polyp detection.
Figure 8B:
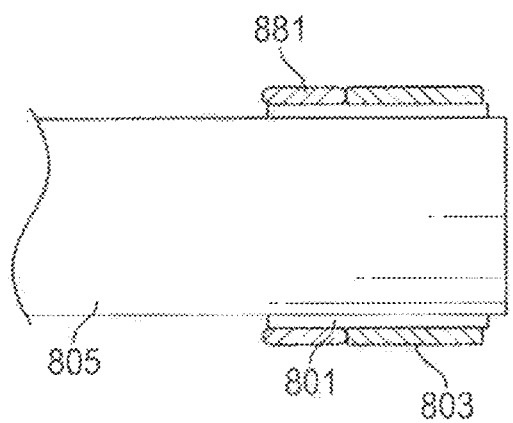
Figure 8C:
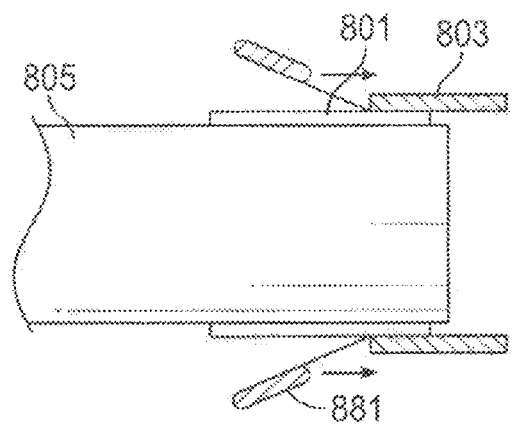
Figure 9A:
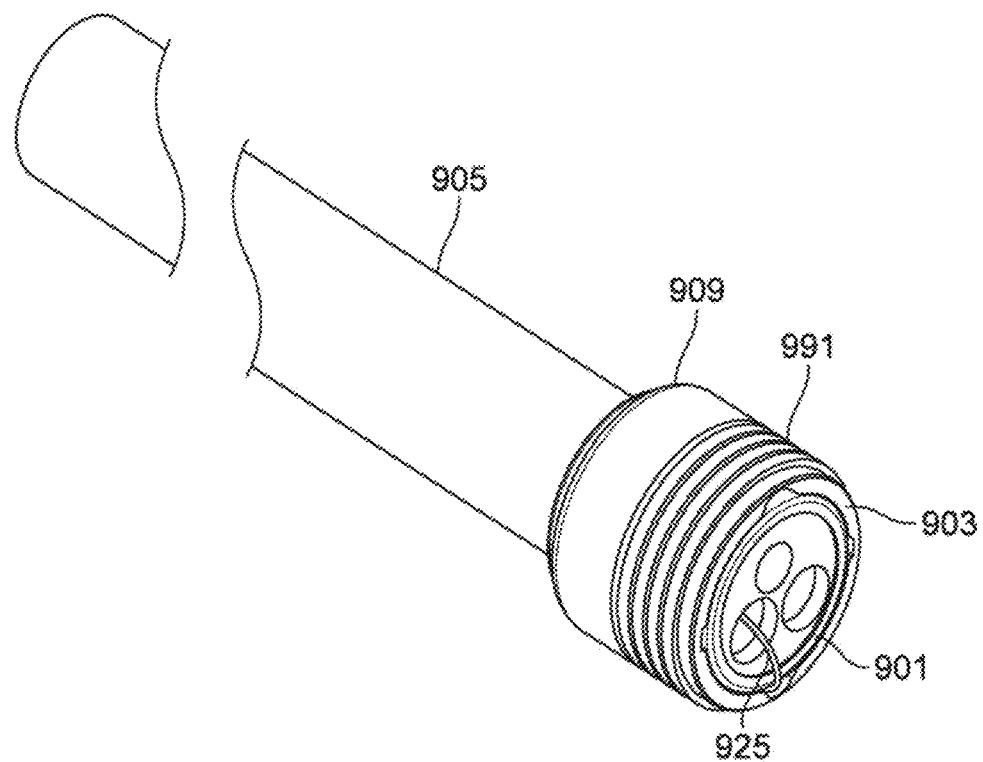
FIGS. 9A-9E show an exemplary telescopic attachment mechanism with ligating features.
Figure 9B:
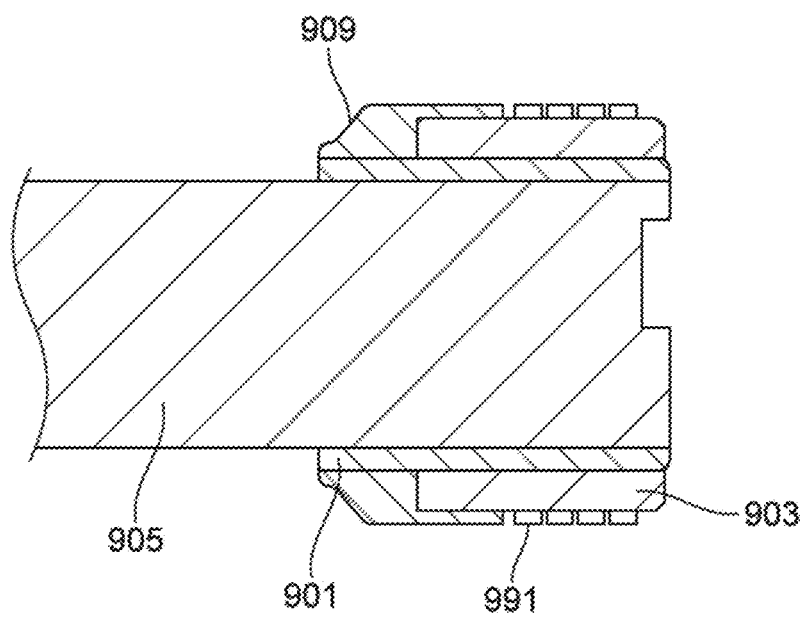
Figure 9C:
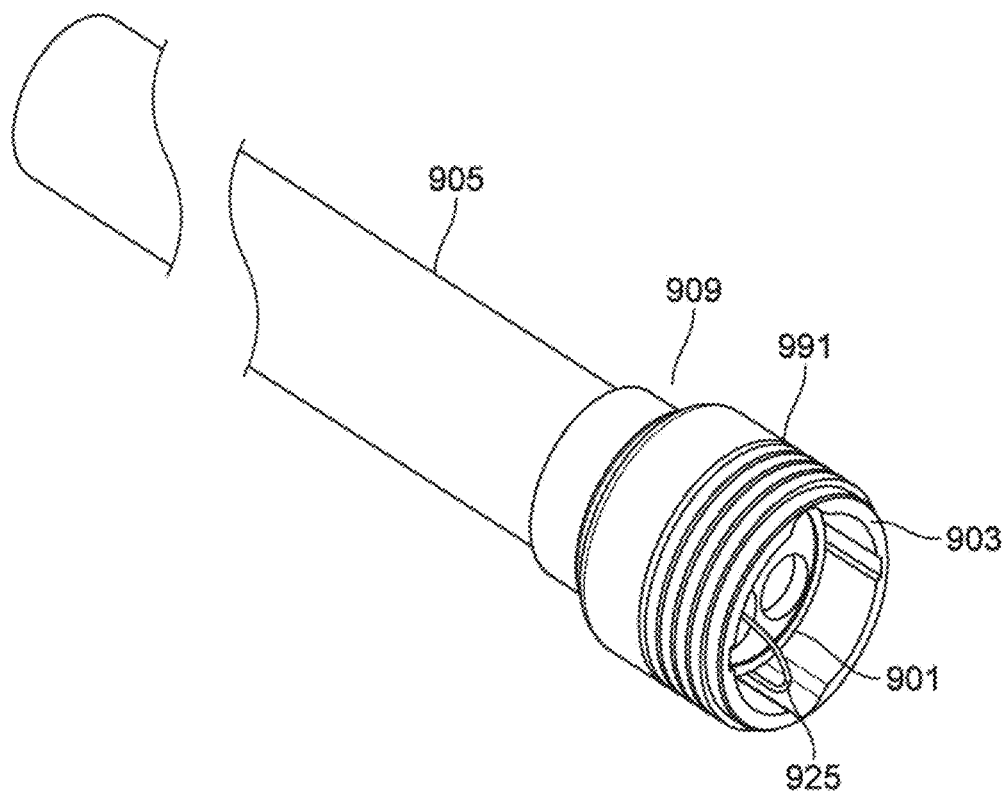
Figure 9D:
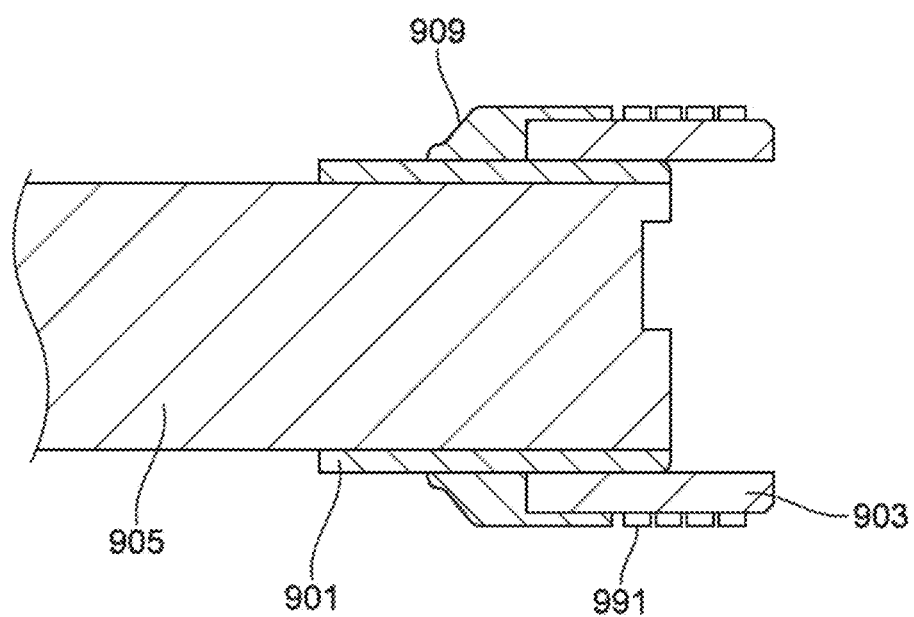
Figure 9E:
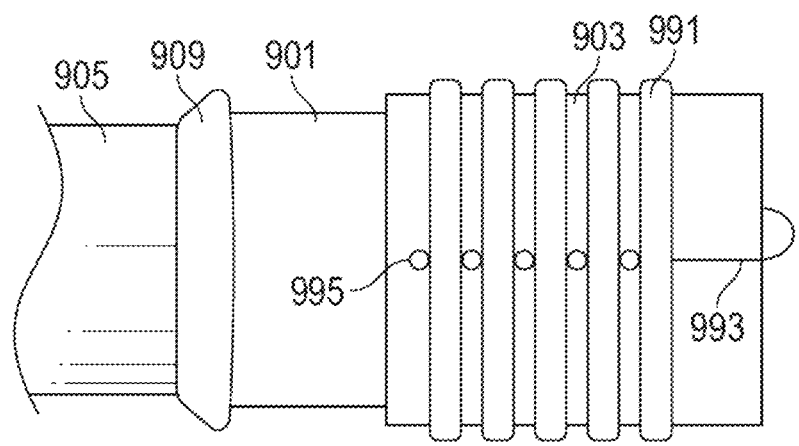

For example, referring to FIGS. 8A-8C, the telescoping features can be used as part of an Endocuff™ or other medical scope accessory that includes pivotable projecting elements for polyp detection. That is, the inner cylinder 801 can include a plurality of pivoting or extendable projecting elements 881 attached to an outer surface thereof. When the outer cylinder 803 is in the retracted position, the projecting elements 881 can be held against the inner cylinder 801 and scope 805 such that they are substantially parallel with the longitudinal axis of the scope 805. When the outer cylinder 803 is in the extended position, the projecting elements 881 can self-expand and extend radially outwards from the inner cylinder 801 and the scope 805. Advantageously, having the projecting elements 881 in the retracted position can ensure that the projecting elements 881 do not drag along the lining of the colon when not in use and that visualization with the scope 805 is not blocked. When the projecting elements 881 are expanded (and the outer cylinder 803 is in a distal position), the projecting elements 881 can be used to flip the folds of the colon backwards to expose hidden polyps during colonoscopy. Exemplary projecting elements are described in U.S. Publication No. 20190183328, the entirety of which is incorporated by reference herein.

As another example, referring to FIGS. 9A-9E, the telescoping features can be used as part of a ligator (e.g., for variceal or hemorrhoidal banding). That is, the inner cylinder 901 can be configured as described elsewhere herein with an attachment ring 909. The outer cylinder 903 can include a plurality of ligating bands 991 thereraround. Further, a banding string 993 with beads 995 thereon to separate the ligating bands 991 (see FIG. 9E) can be positioned through the central channel of the scope 905 and over the distal end of the inner cylinder 901 and the outer cylinder 903. When the banding string 993 is pulled proximally, the bands 991 can be slipped off of the distal end of the outer cylinder 903 for ligation. The ligator can alternatively or additionally include any of the features of the ligators described in U.S. Pat. No. 10,702,273, the entirety of which is incorporated by reference herein. Similar as to described elsewhere herein, the outer cylinder 903 can advantageously be moved to the extended position (see FIGS. 9C-9D) for use (i.e., for ligation) by pulling on the advancement string 925. Further, the outer cylinder 903 can be moved to the retracted position (see FIGS. 9A-9B) as described herein when not in use (i.e., when not ligating) so as to not interfere with imaging by the scope 905.

As another example, the outer cylinder can include an endoscopic cap attached thereto (e.g., for use with endoscopic mucosal resection, hemostasis, foreign body removal, magnifying endoscopy, and/or better visualization of lesions that are difficult to access). The cap can be, for example, a straight cap, an oblique cap, a soft cap, a hood knife cap, and/or a cap that includes flushing ports.

As another example, the telescoping features can be used with, and/or can include, a clip device attached thereto for use in hemostasis, mucosal tears, or perforation repair. An exemplary clip device is described in U.S. Pat. Nos. 9,603,614 and 9,138,227, the entireties of which are incorporated by reference herein.

As another example, the telescoping features can be used with scope extraction devices for removal of foreign bodies.

As another example, the telescoping features can be used with an attachment for natural orifice transluminal endoscopic surgery.

It should be understood that features described with respect to one embodiment can be substituted for or combined with features described with respect to another embodiment.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A telescopic attachment mechanism comprising:
    an inner cylinder configured to attach around a distal end of a scope;
    an outer cylinder slidingly attached around the inner cylinder, the outer cylinder configured to move from a proximal most retracted position to a distal extended position, wherein the outer cylinder in the distal extended position is configured to extend distally beyond the distal end of the scope;
    an advancement string attached to a proximal end of the outer cylinder, wherein the advancement string is configured such that pulling proximally on the advancement string moves the outer cylinder distally;
    a retraction string, different than the advancement string, that is attached to a distal end of the outer cylinder, wherein the retraction string is configured such that pulling proximally on the retraction string moves the outer cylinder proximally; and wherein in the proximal most retracted position, a distal end of the outer cylinder is in a most proximal position relative to the inner cylinder, and wherein the distal end of the outer cylinder is substantially longitudinally aligned with a distal end of the inner cylinder when the outer cylinder is in the proximal most retracted position.

2. The telescopic attachment mechanism of claim 1, wherein the inner cylinder is configured to attach around the distal end of the scope such that a distal tip of the inner cylinder and a distal tip of the scope are substantially flush in the proximal most retracted position.

3. The telescopic attachment mechanism of claim 1, wherein the distal end of the outer cylinder in the proximal most retracted position is 5 mm or less from the distal end of the inner cylinder.

4. The telescopic attachment mechanism of claim 1, wherein the outer cylinder in the distal extended position is configured to extend up to 30 mm beyond the distal end of the scope.

5. The telescopic attachment mechanism of claim 1, wherein an outer surface of the inner cylinder includes a first anti-rotational element, and wherein an inner surface of the outer cylinder includes a second anti-rotational element, the first and second anti-rotational elements configured to engage with one another to maintain rotational alignment of the inner cylinder with the outer cylinder.

6. The telescopic attachment mechanism of claim 1, further comprising an attachment ring configured to fit around the inner cylinder and the distal end of the scope to attach the inner cylinder to the distal end of the scope.

7. The telescopic attachment mechanism of claim 1, wherein the advancement string is configured to extend between the outer cylinder and inner cylinder to loop over the distal end of the inner cylinder and the scope and to extend proximally through a working channel of the scope.

8. The telescopic attachment mechanism of claim 1, wherein the outer cylinder includes one or more grooves on an inner surface thereof configured to accomodate the advancement string extending from the outer cylinder and through one of the one or more grooves between the outer cylinder and inner cylinder.

9. The telescopic attachment mechanism of claim 1, wherein the retraction string is configured to loop over a distal end of the inner cylinder and the scope and to extend proximally through a working channel of the scope.

10. The telescopic attachment mechanism of claim 1, wherein the outer cylinder includes one or more grooves on an inner surface thereof configured to accommodate the retraction string extending from the outer cylinder and through one of one or more grooves between the outer cylinder and inner cylinder.

11. The telescopic attachment mechanism of claim 1, wherein the inner cylinder includes a plurality of extendable projecting elements, the extendable projecting elements configured to collapse when the outer cylinder is in the proximal most retracted position and to expand radially when the outer cylinder is in the distal extended position.

12. The telescopic attachment mechanism of claim 1, wherein the outer cylinder comprises a plurality of ligating bands therearound.

13. The telescopic attachment mechanism of claim 12, further comprising a banding string having beads thereon, the beads configured to be positioned between each ligating band, the banding string extending along the exterior of the telescopic attachment mechanism.

14. The telescopic attachment mechanism of claim 1, wherein the outer cylinder is further configured to rotate relative to the inner cylinder.

15. A method of performing a medical procedure, the method comprising:
   inserting a scope into the body lumen, the scope including a telescoping attachment mechanism attached thereto, wherein an outer cylinder of the telescoping attachment mechanism is in a proximal most retracted position as the scope is inserted into the body lumen, wherein in the proximal most retracted position, a distal end of the outer cylinder is in a most proximal position relative to an inner cylinder of the telescoping attachment mechanism, and wherein the distal end of the outer cylinder is substantially longitudinally aligned with a distal end of the inner cylinder when the outer cylinder is in the proximal most retracted position;
   moving the outer cylinder to a distal extended position by applying a proximal force to an outer cylinder advancement string that extends through the scope;
   performing a procedure in the body lumen with a working element on the telescoping attachment mechanism while the outer cylinder is in the distal extended position; and
   retracting the outer cylinder proximally to a retracted position by applying a proximal force to an outer cylinder retraction string that extends through the scope, the retraction string different than the advancement string.

16. The telescopic attachment mechanism of claim 1, wherein the outer cylinder is telescopic relative to the inner cylinder.

* * * * *